INVENTORS
K.H. HACHMUTH
L.W. MORGAN
BY Hudson & Young
ATTORNEYS

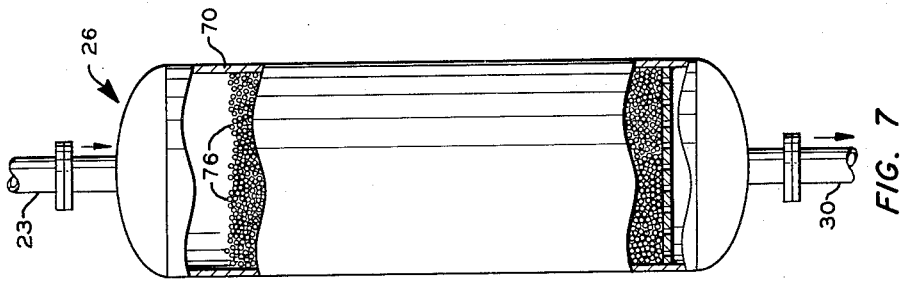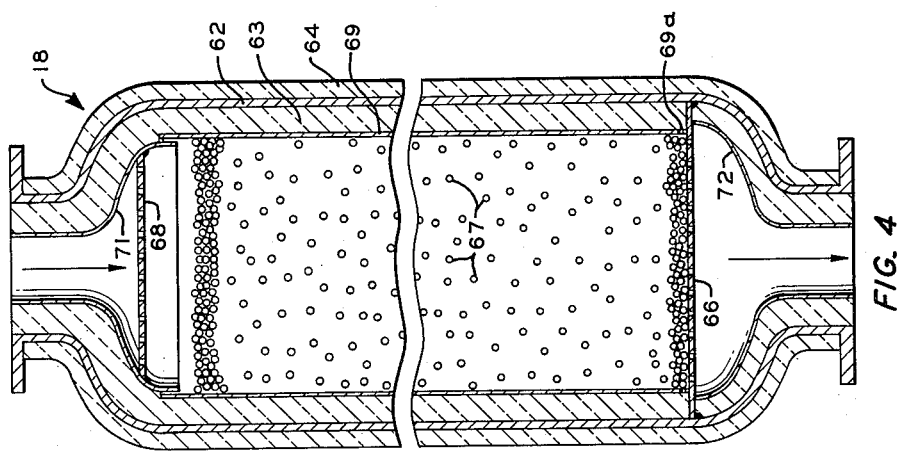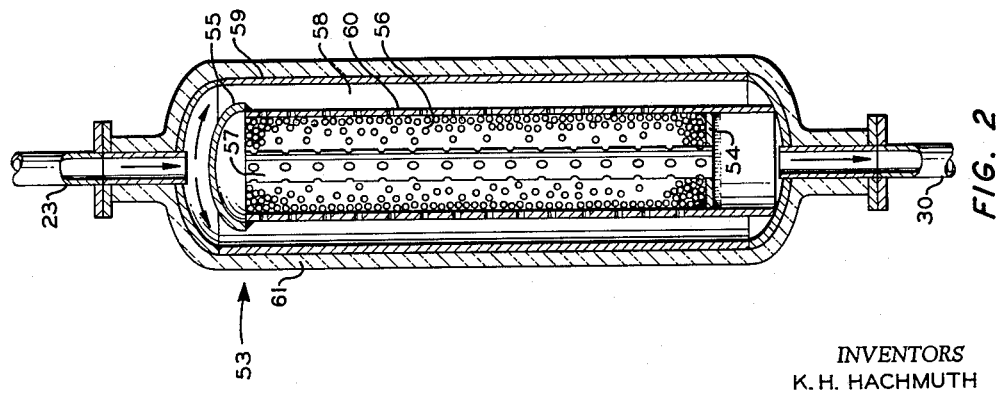

2,995,208
ADSORPTION PROCESS AND APPARATUS

Karl H. Hachmuth and Lyman W. Morgan, Bartlesville, Okla., assignors to Phillips Petroleum Company, a corporation of Delaware
Filed Aug. 15, 1958, Ser. No. 755,328
13 Claims. (Cl. 183—114.2)

This invention relates to adsorption processes. In one aspect, it relates to an adsorption process wherein a small portion of the gaseous feed stream is used for cooling and for regenerating adsorbent beds without need for use of extraneous cooling and/or stripping agents. In another aspect, it relates to a method of operating three or more adsorption chambers for the recovery of condensible liquids from gas whereby a small portion of the gaseous feed stream is used for cooling the regenerated adsorbent bed and for regenerating the adsorbent bed charged with adsorbed materials, the sensible heat from cooling the regenerated bed being used as part of the heat for stripping the charged bed of its adsorbed materials. The invention further involves use of a thermal ballast to reduce cyclic temperature variations in the process.

Cyclic adsorption processes are known. One example of such a process is the treatment of a natural gas by adsorption for removal of one or more adsorbable hydrocarbons from the gas. In another instance, such a cyclic operation is employed in the dehydration of air or other gases by adsorption. In one instance, the feed stream to the operation is divided into two portions, one portion being passed through the main adsorption vessel containing active adsorbent while the other, and possibly a stream of smaller volume, is passed through an adsorption vessel containing adsorbent charged with adsorbed material. Prior to passage of this smaller stream into this latter-mentioned adsorption vessel, the stream of gas is heated for stripping the adsorbed material from the adsorbent.

As is well understood in the adsorption art, a bed of adsorbent which is fully regenerated by hot stripping gases must be cooled prior to reuse as an active adsorbent. In some cases, an inert cooling medium which is not readily adsorbed by the adsorbent is passed through the hot bed until the temperature of the bed has been sufficiently reduced. In other cases air, that is, atmospheric air, is passed through hot adsorbent beds, but the use of atmospheric air is, in some cases, disadvantageous. For example, in case the adsorption process is being used for producing a dehydrated gas, the adsorbent bed during the latter stages of the cooling operation may adsorb appreciable amounts of moisture from the cooling air, thus at least partially deactivating the adsorbent. In other instances, the operation merely allows the stripped, heated adsorbent to cool under the influence of passage of the gases being processed. It is obvious that such operation is to be avoided. We have devised an adsorption process wherein a small portion of the gaseous stream being processed is passed at, for example, atmospheric temperature, through a hot regenerated adsorbent to cool the adsorbent. This cooling gas obviously becomes heated upon passing through the hot adsorbent. We use this heated stream of feed gas for stripping adsorbed constituents from a bed of adsorbent previously charged with materials adsorbed in the process. However, upon continued passage of cooling gas through the regenerated adsorbent, the bed becomes cooled to a temperature such that the effluent gases from the bed of cooling adsorbent do not effectively strip adsorbed materials in the stripping step. In this case, it is necessary to provide additional heat for the stripping operation. This additional heat is provided by a more or less conventional heater. However, the heater must be designed for maximum load during the portion of the cycle in which the cooling gases from the adsorbent bed being cooled are at their lowest temperature in order to provide sufficient temperature for the desorption step. When a hot regenerated adsorbent bed is put on the cooling cycle and the first cooling gases exit from the cooling step at substantially stripping bed temperatures, the heater for providing supplemental heat is obviously not required. Thus, it is obvious that for effective stripping in such a case the supplemental heater must be sized for providing maximum temperatures for heating the cool gases from the cooling operation to stripping temperatures. During a portion of the cooling cycle the heater will be needed to provide a maximum temperature to the gases being heated and at another portion of the cycle the heater will not be needed at all. It is seen that the operation of such a heater is far from constant. As is known in process circles, constancy of operation is always strived for and a constant operation is ordinarily much more efficient than variable operation.

The same condition exists at the outlet of the desorption step of our cycle, but in a reverse manner, because the hot gases removed from the stripping step contain the materials being stripped from the adsorbent and in order to recover product these gases must be cooled. The stripping gases entering the stripper under cyclic varying temperatures will pass from the stripper also under cyclic varying temperatures. It is realized that in order to obtain maximum recovery of materials being processed a condenser is needed for cooling the outlet vapors from the stripper. Under the conditions that temperatures of the effluent vapors from the stripper vary cyclicly makes the cooling load of the condenser also very cyclicly in the same manner as hereinabove explained relative to the heater used on the stream of cooling gases from the cooling step.

Our invention provides a process for averaging at least to an appreciable extent the cyclic temperature variations of the cooling gases from the cooling step. Also our method provides for averaging the cyclic variable temperatures of the effluent vapors from the stripping step. Reducing the cyclic variations in temperatures of the gases for the cooling step results in a reduction of the variations in the heat load of the heater. Also, reducing the cyclic variations of temperatures of the effluent vapors from the desorbing step reduces the fluctuations in cooling requirements of the condenser.

To accomplish these results, we use a heat ballast in one or more forms for averaging these temperatures.

The use of our heat ballast is not intended as a means for heat conservation but is strictly for the purpose of reducing the temperature fluctuations of the above-mentioned streams of gases in order to provide for more nearly uniform heat requirements of the heater and cooling requirements for the condenser. Thus, it is realized that by providing for more nearly uniform heat requirements and cooling requirements our process operates much more smoothly than when the heater and condenser fluctuate in their requirements from a 100 percent requirement to a 0 percent requirement.

Furthermore, a smaller heater and a smaller cooler and condenser will suffice for a given plant capacity, saving in first cost on the heater and cooler, as well as saving in maintenance from smaller changes in temperature.

Another point of our invention which we find is advantageous is that we preferably use two or more adsorption vessels in parallel in the main adsorption portion of the operation. When two adsorption vessels are so used, it is realized that the rate of flow of materials being treated is reduced to half of that required if only one adsorption vessel were used. Also, if three or more adsorption vessels are used, the rate of flow of material being treated is only a third or less of the total stream being processed. In this manner, recovery of materials being adsorbed is more efficient than when gas flow through the adsorbent is more rapid. However, when two adsorption vessels are used in parallel, we remove from the adsorption step the adsorption vessel which has been longest on the adsorption step and place it on the regeneration step. Then the adsorption vessel which has been on the adsorption step the shorter length of time replaces the adsorption vessel just removed and a fully regenerated and cooled adsorption vessel is then placed in parallel with the one remaining. In case three or four adsorption vessels are used in parallel, we employ the same general idea in removing the adsorption vessel which has been on adsorption the longest period of time for regeneration.

An object of our invention is to provide a novel adsorption process which is adapted for treatment of large volumes of gases.

Another object of our invention is to provide a process for the recovery of one or more constituents from gases containing them by selective adsorption.

Another object of our invention is to provide such an adsorption process wherein a portion of the feed gas being treated is employed for cooling regenerated adsorbent as well as for stripping the adsorbent charged with selectively adsorbed materials.

Yet another object of our invention is to provide a means and a method for averaging the heat requirements and the cooling requirements of the heater and cooler, respectively, operating on inlet gases (outlet gases from the cooling step) to and outlet vapors from, respectively, the stripping step of the operation.

Another object of our invention is to provide a useful form of adsorption vessel and a useful form of heat ballast material containing vessel for use in this and in other operations.

Another object of our invention is to provide heat averaging means and method which has other applications than the one described herein as an example.

Still other objects and advantages will be realized upon reading the following description which, taken with the attached drawing, forms a part of this specification.

In the drawing, FIGURE 1 illustrates, in diagrammatic form, an arrangement of apparatus parts for carrying out an operation of our invention.

FIGURE 2 is an elevational view, partly in section, of an alternate form of a portion of the apparatus of FIGURE 1.

FIGURE 4 is an elevational view, in section, of a portion of the apparatus of FIGURE 1.

FIGURE 7 is an elevational view of a portion of the apparatus of FIGURE 1.

Figures 1, 3:
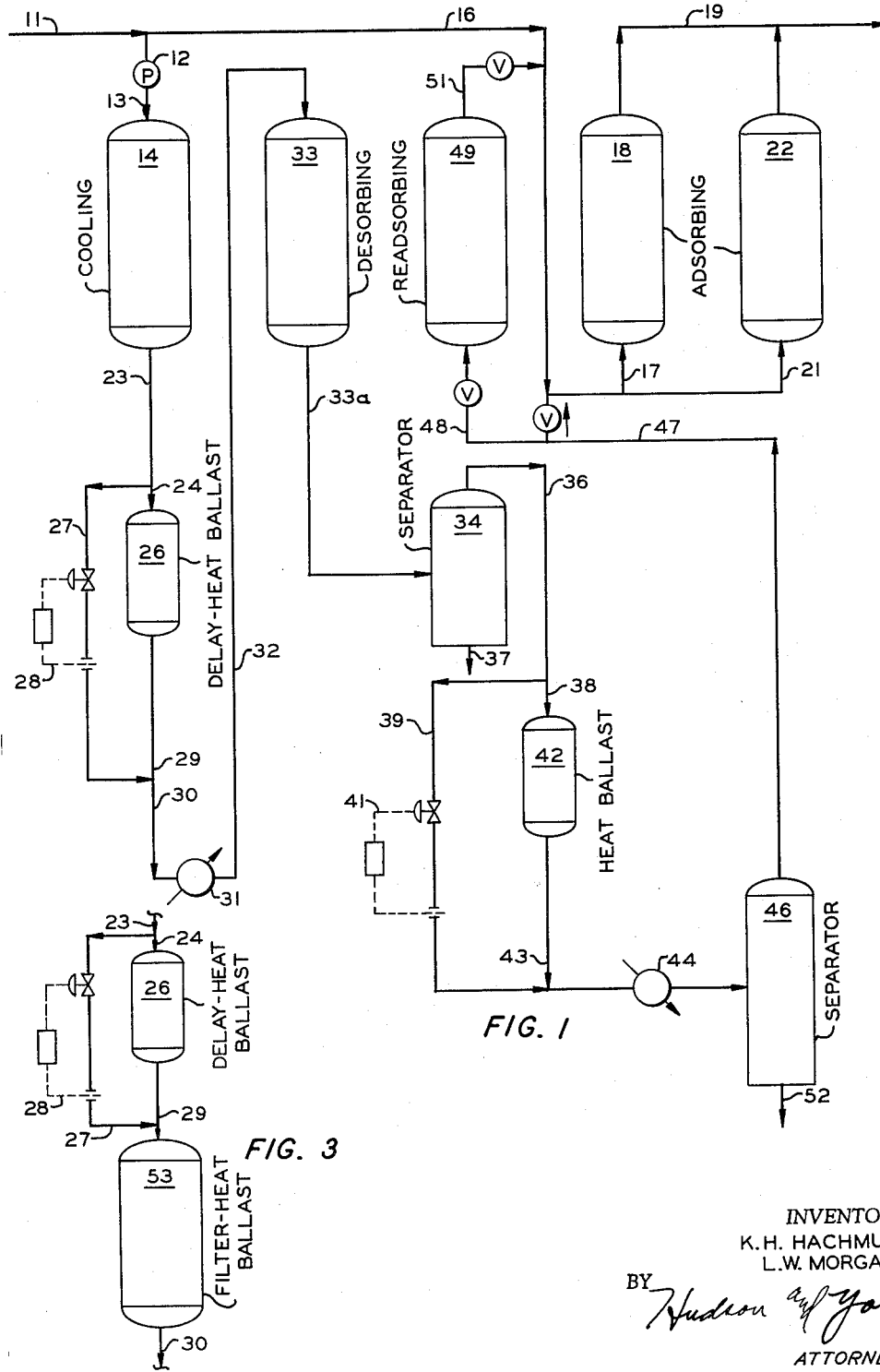
FIGURE 3 illustrates apparatus suitable for substitution in place of a portion of the apparatus of FIGURE 1.

Referring now to the drawing, and specifically to FIGURE 1, reference numeral 11 identifies pipe for passage of, for example, natural gas to be treated, from a source not shown, to our apparatus. This gas is divided into several parallel flow portions, one of which is passed under the influence of pump 12 in pipe 13 into a vessel 14 which contains hot, stripped adsorbent to be cooled. As an illustration of the operation of our process, the gas passing through pipe 13 has a temperature of about 80° F. Vessel 14 is provided with a conventional adsorbent material selective for adsorbing certain desired materials from the natural gas. Among such adsorbents, adsorbent silica gel and adsorbent charcoal are used. We will explain our process relative to the use of adsorbent silica gel. Vessel 14 is charged with a suitable quantity of adsorbent silica gel. A pipe 23 conducts hot cooling gas from vessel 14, a portion of which flows through a pipe 24 into another vessel 26 containing a heat ballast material and the remainder bypassing this vessel and flowing through a pipe 27. A rate of flow controller 28 is installed in pipe 27 for regulating the rate of flow of gas in pipe 27 relative to that flowing through pipe 24. In some cases it is desired that half of the gas be passed through pipe 27 and the other half through pipe 24. Effluent gas from vessel 26 is removed by way of a pipe 29. The by-pass gas from pipe 27 is added to the gas withdrawn from vessel 26 and the combined stream of gas flows on through a pipe 30 to a heater 31. This heater is, if desired, a conventional fired heater. Hot gases from heater 31 pass through a pipe 32 to the top of a vessel 33 which is also provided preferably with the same kind and quantity of adsorbent as contained in vessel 14. Vessel 33, when placed in the service illustrated in FIGURE 1, is on the desorbing or stripping cycle of the operation. Stripping gases containing desorbed or stripped materials pass from vessel 33 through a pipe 33a into a phase separator 34. Phase separator 34 is provided in case materials leaving vessel 33 contain liquid. Liquid is withdrawn from vessel 34 through a pipe 37 while vapors and gases pass through a pipe 36, a portion passing through a pipe 39 as regulated by a rate of flow controller 41, with the remainder passing through a pipe 38 into a vessel 42. Vessel 42 is a heat ballast containing vessel similar to vessel 26. It is usually preferable to adjust the rate of flow controller 41 so that about half the gas and vapor flowing through pipe 36 is routed through a vessel 42 and the other half by-passes this vessel. Fluid leaving vessel 42 passes through a pipe 43 to which the by-pass material is added and the combined stream passes into a cooler 44 for condensation of materials separated in the process. Condensate and uncondensed gases pass into a phase separator 46, liquid therefrom being withdrawn through a pipe 52, while uncondensed gases pass through a pipe 47 to subsequent processing.

In one instance the uncondensed gas from pipe 47, which frequently contains recoverable concentrations of desired constituents, is combined with the feed material passing through pipe 16 and the combined stream is then divided into two portions, one portion passing through a pipe 17 into an adsorber vessel 18 and the remainder passing on through a pipe 21 into another adsorber vessel 22. Fully treated gases leave these vessels and are passed through a pipe 19 to such disposal as desired.

It is intended, according to our operation, that the adsorbent containing vessel 22 has been just previously regenerated and cooled and has just been placed in the service illustrated in FIGURE 1 on the adsorption portion of the cycle. Adsorbent containing vessel 18 has been on the adsorption step of the cycle for a longer period of time than vessel 22 and vessel 18 will be the first taken off the adsorption step for regeneration purposes.

As an alternative to this mode of operating, we find it advantageous, in many cases, to provide a fifth adsorption vessel 49. This adsorption vessel 49, as illustrated in FIGURE 1, is placed in operation merely by closing the valve in pipe 47 and opening the valves in pipes 48 and 51. In this manner unadsorbed vapors from separator 46 pass through pipes 47 and 48 into the readsorber 49 with unadsorbed gases passing through pipe 51 for combining with the portion of the feed in pipe 16. This combined steam then passes on to adsorption vessels 18 and 22. In this case vessel 49 may, if desired, be called a readsorption vessel because it readsorbs relatively rich vapors from separator 46 rather than allowing these relatively rich vapors to go directly to adsorbers 18 and 22.

In this manner, that is, when using readsorber 49, adsorbent vessels 18 and 22 can be used on the adsorption step of the cycle for longer periods of time. When adsorbent vessel 18 has been on its portion of the cycle for a sufficient length of time, vessel 18 is the one removed from its service illustrated in FIGURE 1 to be placed on the readsorbing step. It is suitable for readsorbing a feed stock from pipe 48 having a greater concentration of adsorbable material than the feed stock to the process in pipe 11. After the readsorbing vessel 49 has been used for the length of time required for the stripping operation in vessel 13 and the cooling operation in vessel 14, readsorber 49 becomes the vessel being stripped and the stripped vessel 33 becomes the vessel being cooled. Thus in our operation a fully regenerated and cooled adsorbent vessel becomes first vessel 22, then vessel 18, then readsorber vessel 49, then regenerating vessel 33 and then finally cooling vessel 14; if readsorption is not employed, the operative sequence is vessel 22, vessel 18, vessel 33 and vessel 14.

Using readsorber 49 insures that all the adsorbent in vessels 18 and 22 is useful for adsorbing vapors from lean gas, that is, countercurrent adsorption is achieved.

The particular valving and piping required for such switching are not a part of our invention and for purposes of simplicity and brevity are not illustrated in the drawing nor otherwise described in the specification. Those skilled in the adsorption processing art and in valving and instrumentation art understand the installation and operation of such valving and piping.

In FIGURE 2 is illustrated an elevational view, partly in section, of one form of vessel suitable for use as in the temperature averaging step of our invention. This vessel is a steel vessel having a heavy steel shell 59 in case the process is carried out under high pressures. It is preferable that shell 59 be provided with exterior insulation 61. Within this shell is provided a bed plate 54 and a cylindrical ballast retainer member 60, as shown. This ballast retainer 60 is perforated for easy flow of gases therethrough. A perforate tube 57 is disposed axially in this vessel, as illustrated. In the annular space between perforate tube 57 and the perforate retainer 60 is disposed such heat ballast material 56 as desired. This ballast material is preferably relatively large in size, for example, ½ inch in diameter. This material is well sized and preferably does not contain appreciable material much finer than, for example, balls or pellets of about ½ inch in diameter. The cylindrical ballast retainer is appreciably smaller in diameter than the inner diameter of shell 59 for the purpose of providing an annular passageway 58 for flow of gases prior to their flow into the actual ballast. This heat ballast containing vessel 53 is constructed in the manner described for the purpose of providing a short flow path or short path length over which the gases pass for rapid heating or for rapid cooling, as the case may be. By providing such a short flow path there is substantially no heat delay in this vessel. In this manner gases entering vessel 53 through pipe 23 are directed to the annular space 58 by a distributor cap 55, and these gases then flow through the short path and leave the ballast by flowing through the perforations in the perforate tube 57 prior to exit from the vessel through pipe 30. In this manner the time delay of heat absorption in and of heat evolution from the ballast in vessel 53 is very short. How short the length of time is will be dependent at least to some extent on the length of flow path of the gases in the ballast. As illustrated in FIGURE 2, the length of flow path of the gases is very short.

The reason for wanting a short flow path is to keep all the bed at the same temperature at the same time. If a longer path length were used, it would be correspondingly more difficult for heat to distribute itself uniformly within the bed. The size of the flow channels is not very important; they turn out being relatively large because large pellets are used. Large pellets are used to force the gases to transfer a small amount of heat to each pellet in its path length. This heat transfer is in contrast to the delay-type heat ballast in which hot gases entering the ballast lose all their heat to the first few pellets in its path and later gases passing over already heated pellets lose heat to pellets farther along. This last described action would resemble that of a delay bed type of ballast.

The path length must be long enough to provide the amount of heat transfer surface needed to change the temperature of the gases. But this path area must involve enough heat capacity to keep the pellets from changing temperature too much. Also, conduction of heat between pellets is very desirable. A short path length and large pellets conspire to limit the heat transfer surface and thus the problem is one of balancing competing factors.

When using the type of ballast and vessel illustrated in FIGURE 2 in the general apparatus configuration of FIGURE 1, pipe 23 of FIGURE 2 becomes pipe 23 of FIGURE 1 and pipe 30 of FIGURE 2 becomes pipe 30 of FIGURE 1. In other words, the heat ballast vessel 53 merely replaces vessel 26 and by-pass pipe 27. In like manner, when the heat ballast vessel 53 is employed in the cooling step just prior to cooler 44 of FIGURE 1, vessel 53 merely replaces vessel 42 and by-pass pipe 39.

In FIGURE 7 is illustrated the delay-type of heat ballast material intended for use in heat ballast material 26 when using by-pass 27. This heat ballast material in vessel 26, identified in FIGURE 7 by reference numeral 76, is relatively fine material, for example, $\frac{1}{10}$ to $\frac{1}{8}$ inch in diameter. This material may be iron, steel, aluminum, quartz, alumina, silicon carbide, and the like. The particular heat ballast material is frequently selected taking into account economic, as well as physical properties, and other considerations. In this type of heat ballast, which is termed herein delay heat ballast, the vessel is relatively long and gases flowing through the vessel must traverse a long path or a long flow path through the ballast. This long flow path is in contrast to the short flow path mentioned above relative to the short flow path ballast illustrated in FIGURE 2. In the operation employing the long flow path or delay-type ballast as illustrated in vessel 26, when passing hot gases into the top of the vessel these gases first contact, of course, the upper portion of the ballast. This upper portion of ballast is heated; and on becoming heated, of course cools the gases and the gases then traverse the remainder of the long ballast bed as cooled gases and little to no temperature changes to either the ballast or gases takes place. When the upper layer or a few inches, for example, of the ballast becomes heated, the hot gases flow through this hot layer of ballast unchanged in temperature and contact the next cool portion of ballast. This next portion of ballast then becomes heated and simultaneously cools the gases. In this mode of operation there is, to all intents and purposes, a heat front passing from the top of the bed of ballast to the bottom and this heat front moves slowly relative to the rate of flow of gases therethrough. When this type of heat ballast is used as the heat ballast illustrated in FIGURE 1, when flowing half the stream of gas from pipe 23 through the ballast containing vessel 26 and the other half being by-passed through pipe 27, the half of the gases flowing through pipe 27 is not changed as regards temperature. Gases leaving pipe 27 and entering pipe 30 are hot gases having substantially the same temperature as the gases leaving cooling vessel 14 by way of pipe 23. The gases leaving ballast vessel 26 while the ballast therein is being heated are cool gases. Thus the hot by-passed gases from pipe 27 are mixed with the cool gases exiting from vessel 26 through pipe 29, the result being that gases flowing through pipe 30 are averaged in temperature between the temperature of the by-pass gases in pipe 27 and the gases in pipe 29.

During the latter part of the cooling of vessel 14 the gases passing through pipe 23 are not nearly as hot as they were during the early part of the cooling cycle. Thus, the half of the gases from pipe 23, during this latter portion of the cooling of vessel 14, which enter the ballast vessel 26 are cooler than the ballast in the vessel. The cool gases then flowing through pipe 24 into vessel 26 cool the ballast in the same general manner as the heating of the ballast, as above described. In other words, there is a cool front which flows from the top of the ballast bed to the bottom as the gases, which are cooler than the ballast, flow through the bed. The gases which leave the ballast vessel 26 through pipe 29 are at a higher temperature than the by-pass gases and when these low temperature by-pass gases from pipe 27 are mixed with the higher temperature gases in pipe 29, the mixture possesses a temperature intermediate these limits, thus averaging these temperatures.

Figure 5:
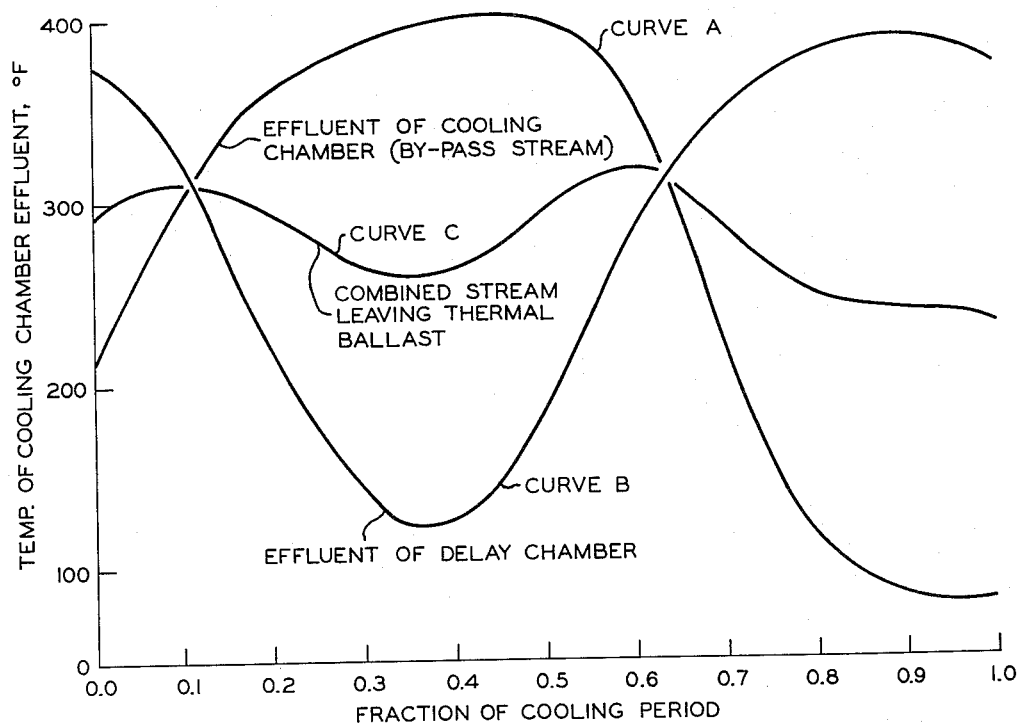
FIGURE 5 shows temperature curves obtained when using the apparatus of FIGURE 1.

On reference to FIGURE 5 of the drawing, there are illustrated temperature curves illustrating the operation of the delay-type ballast. Curve A illustrates the cyclic temperature variations of the cooling chamber effluent passing through pipe 23. As will be noted, when the chamber 14 contains hot, freshly stripped adsorbent, the left hand portion of curve A shows a high temperature. Upon further passage of cooling gases from vessel 14, their temperature is decreased, as illustrated in the right hand portion of curve A.

Curve B illustrates the cyclic temperature of the gases passing through pipe 29 from the delay chamber 26. It will be noted that the temperatures of the gases leaving delay chamber 26 are just opposite those entering chamber 26. In other words, hot gases entering chamber 26 are cooled and cool gases entering chamber 26 are heated. Curve C of this figure illustrates the temperature of the combined stream of gases flowing through pipe 30. On reference to FIGURE 5, for example, it will be noted that at a point representing about 0.45 fraction of the cooling period the maximum temperature of the gases entering the delay chamber 26 is about 400° F. The temperature of the effluent of the delay chamber at about 0.45 fraction of the cooling cycle is about 148° F. On further reference to the corresponding point on curve C the temperature of these gases, as combined in pipe 30, is about 275° F. It will be noted that the maximums of curve C are considerably lower than the maximums of curve A and the minimums of curve C are considerably higher than the minimums of curve B; thus by using this delay-type ballast it is seen that the temperatures indicated by curve C vary much less than the temperatures indicated by curves A and B.

If this heat ballast arrangement were not used, the heater 31 would be required to provide heat for heating the cooling gases flowing through pipe 30 at one time from a temperature of 80° F. to a maximum of 400, while at another portion of the cooling cycle the heating required of heater 31 is zero. In other words, at one time the heater 31 would be required to operate at full capacity while after an interval of time the heat requirement would be reduced to zero. It is obvious that operation of a heater in this manner, that is, from a very high requirement to no requirement at all and then again to a very high requirement, represents very poor operation. On reference to FIGURE 5, it is noted that the lowest point on curve C is slightly more than 230° F. while the highest temperature on curve C is approximately 320° F. Thus, the difference in the heat requirements, instead of being 400° F. minus 80° F., that is, 320° F., is only 90° F., or the difference between 320° F. and 230° F. While a 90° F. difference in temperature requirements represents an appreciable variation in heater operation, it is nevertheless much smaller than the 320° F. difference required when ballast and by-pass are not used.

When the short path type of ballast, as illustrated in FIGURE 2, is substituted for the delay-type of ballast, the use of which is illustrated in FIGURES 1 and 7, the temperature variation reduction of the effluent gases from the chamber is about the same.

Figure 6:
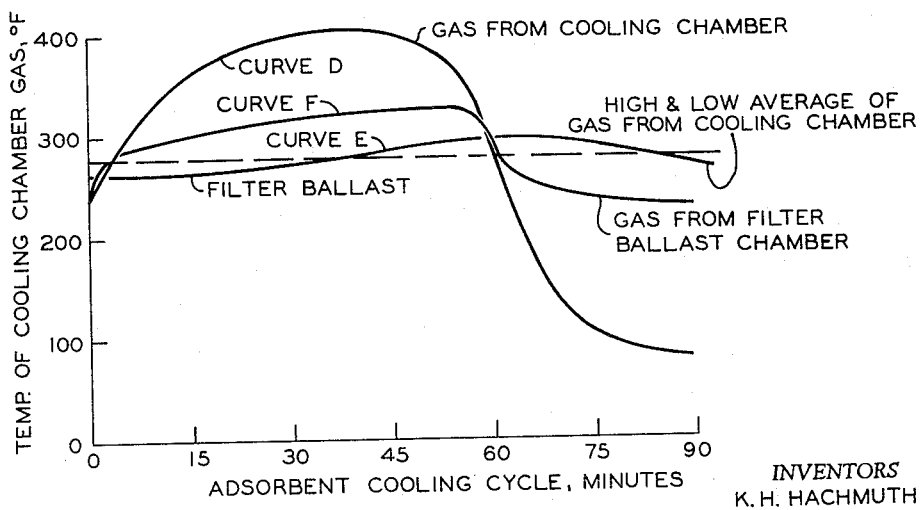
FIGURE 6 shows temperature curves obtained when using the apparatus of FIGURE 2 substituted for a portion of the apparatus of FIGURE 1.

On reference to FIGURE 6, curve D illustrates the cyclic temperature variation of the cooling gases leaving cooling chamber 14 and this curve is equivalent to curve A of FIGURE 7. Curve E illustrates the temperature of the coarse ballast material 56 in vessel 53 of FIGURE 2 plotted against cooling cycle, in minutes. Curve F illustrates the temperature of the effluent from chamber 53 during the cooling cycle. These curves are drawn as based on a 1.5 hours cooling cycle. It is noted that, at first, curve F rises rather rapidly, then rises much less rapidly to a maximum after which it falls rapidly and then the rate of fall is decreased toward the end of the cooling cycle. The maximum temperature of the gases leaving vessel 53 through pipe 30 is approximately 330° F. based on a maximum entrance temperature of 400° F. The lowest temperature of the gases leaving vessel 53 is about 230° F. This temperature variation between 330° F. and 230° F. is 100° F. which is the temperature differential requirement necessary to be taken care of by variable operation of heater 31. It is obvious that heater 31 can be much more easily operated to heat gases passing therethrough from a temperature of 230° F. to 400° F. and from a temperature of 330° F. to 400° F. than it can operate to heat gases from a minimum of 80° F. to 400° F., followed by a cycle which requires no temperature increase at all.

The effectiveness of the delay-type ballast depends on two factors, (1) the symmetry of the wave, (2) the exactness with which the delayed wave matches the undelayed wave. If the delay bed were ideal in operation, then, factor 1 will determine the quality of smoothing. Thus the more lopsided the wave, the worse the best possible delay bed performance, and perfect sine waves would be smoothed exactly.

The effectiveness of the filter-type ballast on the other hand can be improved indefinitely by making it larger, and it would smooth lopsided waves better than it would sine waves regardless of how large it was.

Curve A (FIGURE 5) and curve D (FIGURE 6) begin at temperatures below 400° F. because stripping in desorbing vessel 33 is not carried to completion and at the end of the stripping cycle in vessel 33 outlet temperature is at the temperature of the beginning of curves A and D, and stripping is actually completed during the early stages of the cooling cycle in vessel 14.

In FIGURE 4 we illustrate a vessel suitable for use in our process in which is disposed a bed of suitable adsorbent supported by a bed support plate 66. We find that by providing a layer of insulation 63 inside a steel shell 62, temperature changes of the steel shell are markedly reduced. On the outside of the shell is, of course, an outer insulation. We find, also, that the insulations 63 and 64 together need not be larger in amount than if all of the insulation were placed on the outside of the shell. To prevent the inner insulation 63 from becoming wet with liquid in case liquid forms during any portion of the process cycle, an impervious layer of material, such as a thin steel liner 69, is provided. It is obvious that if any part of insulation 63 became wet, it would lose a large portion of its thermal insulating value. Upper liner 71 is telescoped within the upper end of liner 69 so that any liquid which might form in the upper portion of this vessel or enter this vessel with the gaseous feed cannot flow through the joint between liner 71 and liner 69 into the insulation. The lower end of liner 69 is provided with openings 69a so that any liquid inadvertently present in insulation 63 will enter the fluid stream in process. A perforate baffle 68 is provided above the top surface of the adsorbent bed. The joint between baffles 71 and 69 also serves as an expansion joint.

As an added advantage in the particular form of filter ballast illustrated in FIGURE 2, the chamber in which this ballast is disposed can be exactly of the same conformity as the chamber or shell 62 of FIGURE 4. In one instance, subsequently described, a suitable delay-type ballast bed of alumina pellets is 3¼ feet in diameter and about 11 feet long, while the adsorption bed is 9 feet in diameter by 15 feet long. This adsorption bed is over ten times the volume of the ballast bed, but this delay-type ballast bed has about one-half the heat capacity of the adsorbent bed. To reduce investment, the ballast bed should be as dense and have as high a heat capacity per unit of volume as practical.

While we have herein disclosed the use of a delay-type ballast arrangement, and the use of a filter-type ballast arrangement in the effluent gas from cooling chamber 14 and in the stripping vapor effluent from stripping vessel 33, we, in some instances, prefer to use a combination of the two types of ballasts. This combination is illustrated in FIGURE 3 in which vessel 26 is exactly like vessel 26 of FIGURE 1 containing the delay-type ballast, and vessel 53 containing filter-type ballast as illustrated in FIGURE 2. After combining the gas streams from the vessel 26, or vessel 42 and that from the respective by-pass lines, the combined stream is then passed through a filter-type ballast chamber 53. In this combination arrangement it will be realized that the cyclic temperature variations are further averaged so that the effluent gases leaving filter chamber 53 of FIGURE 3 will have still smaller temperature fluctuations than either of the arrangements illustrated in the other drawings.

In one instance a suitable delay-type ballast is alumina pellets of about .10 inch in diameter. Such a delay-type ballast is provided in a vessel with an effective bed having a diameter of 3¼ feet and a length of about 11 feet. The specific heat of such alumina pellets is about 0.284. Other materials than alumina are used, under some conditions, for making pellets for the delay-type ballast such as cast iron, steel, aluminum, quartz, and silicon carbide. When using any of these various pellet materials, it is obvious that the specific heat and other physical properties will need to be taken into consideration.

Pellets for use in the filter-type ballast, such as illustrated in FIGURE 2, are, when desired, made of the same materials as mentioned above. For the filter-type ballast bed the pellets are larger in size, as, for example, ½-inch diameter, than the pellets for the delay-type ballast.

As an example of the operation of our adsorption process is the following example:

SPECIFIC EXAMPLE

Our process is simplified over that of much of the prior art to the extent that the entire process operates at constant pressure (except for friction losses), uses only one process gas (the feed itself), and automatically conserves heat without need of heat exchangers other than the primary heater and the product cooler and condenser.

In the following specific example, the feed stock is relatively dry and free of sulfur, and enters the system at 700 p.s.i. (pounds per square inch) at 80° F.

[Feed gas—200,000 M ft.³/day at 14.7 p.s.i. (pounds per square inch absolute) and 60° F.]

| Feed Gas | Mol fraction | Lb. mols/hr. | Lbs./hr. | Gallons/day |
|---|---|---|---|---|
| Methane | 0.975 | 21,520 | 344,300 | |
| Ethane | 0.0126 | 278 | 8,340 | |
| Propane | 0.00649 | 143.2 | 6,300 | 35,740 |
| Isobutane | 0.00148 | 32.66 | 1,894 | 9,700 |
| Normal butane | 0.00187 | 41.26 | 2,393 | 11,820 |
| Isopentane | 0.00080 | 17.65 | 1,271 | 5,870 |
| Normal pentane | 0.00090 | 19.86 | 1,430 | 6,540 |
| Normal hexane | 0.00086 | 18.97 | 1,632 | 7,080 |
| | 1.00000 | 22,072.00 | 367,560 | 76,750 |

Only about 2.44 percent of the feed gas stream is passed into the vessel being cooled while the remainder goes directly to the vessels on the adsorption step.

Two vessels are used in parallel on the adsorption step of the cycle, each having an adsorbent bed diameter of 9.18 feet and a length of 15 feet, one on desorption or stripping and one on the cooling cycle (the 3-part cycle embodiment) provided with adsorbent consisting of particles of about 0.1 inch effective diameter. Pressure drop through these adsorbent beds when passing 367,560 pounds feed per hour is approximately 3.1 pounds per square inch.

The cooling gases from the chamber being cooled decreased from about 400° F. at the start to approximately 80° F. at the end of the cooling cycle.

Table I gives data illustrating temperatures and stream compositions and other data when treating the feed gas, the composition and rate of flow in pound mols per hour given above, in our 3-part cycle (absorption, stripping and cooling). All compositions excepting feed in Tables I, III, V, VI, VII and VIII are average compositions.

Table I

STREAM COMPOSITIONS AND QUALITIES

Three part cycle.
Silica gel adsorbent.
Adsorption period, 4.23 hours.
Mass velocity through adsorbing bed, 2,780 lb./hr.ft.²
Mass velocity through cooling and stripping beds, 139 lb./hr.ft.²
Two absorbing beds in parallel.

| Component | Pound mols per hour | | | | | |
|---|---|---|---|---|---|---|
| | Feed to adsorbers | Feed to stripper and cooler | Effluent from stripper | Lean gas from adsorbers | Rich gas from separator | Condensate from separator |
| Methane | 20,995 | 525 | 528 | 20,992 | 520 | 8.19 |
| Ethane | 271 | 6.78 | 7.53 | 270 | 7.08 | 0.45 |
| Propane | 139.7 | 3.49 | 5.22 | 138.0 | 4.46 | 0.76 |
| Isobutane | 31.86 | 0.797 | 2.64 | 30.02 | 1.96 | 0.68 |
| Normal butane | 40.25 | 1.006 | 4.41 | 36.85 | 3.03 | 1.38 |
| Isopentane | 17.22 | 0.430 | 7.24 | 10.41 | 3.86 | 3.38 |
| Normal pentane | 19.38 | 0.484 | 9.36 | 10.50 | 4.59 | 4.77 |
| Hexane | 18.51 | 0.463 | 18.97 | 0.00 | 5.66 | 13.31 |
| | 21,533 | 539 | 583 | 21,488 | 551 | 32.92 |
| Temperatures, ° F. | 80 | ¹ 80 | | 82 | 80 | 80 |

¹ To cooler only.

Stripping gas heater duty, average, 661,000 B.t.u./hr.
Condenser and cooler duty, average, 470,000 B.t.u./hr.

Table II gives a time cycle sequence for operation of the 3-part cycle of Table I.

Table II
TIME CYCLE SEQUENCE

Three part cycle.
Adsorption period, 4.23 hours.
Two adsorbing beds in parallel.

| Vessel (Fig. 1) | Start adsorption | Start stripping | Start cooling | Start adsorption |
|---|---|---|---|---|
| A | 11:39 a.m. | 3:53 p.m. | 6:00 p.m. | 8:07 p.m. |
| B | 1:46 p.m. | 6:00 p.m. | 8:07 p.m. | 10:14 p.m. |
| C | 3:53 p.m. | 8:07 p.m. | 10:14 p.m. | 0:21 a.m. |
| D | 6:00 p.m. | 10:14 p.m. | 0:21 a.m. | 2:28 a.m. |

Table III gives data illustrating temperatures and stream compositions and other data when treating the feed gas, of the composition and rate of flow in pound mols Table IV gives a time cycle sequence for the operation of the 4-part cycle of Table III.

Table IV
TIME CYCLE SEQUENCE

Four part cycle.
Adsorption period, 4.23 hours.
Two adsorbing beds in parallel.

| Vessel (Fig. 2) | Start Adsorption | Start Readsorption | Start Stripping | Start Cooling | Start Adsorption |
|---|---|---|---|---|---|
| A | 0:00 | 4:14 a.m. | 6:21 a.m. | 8:28 a.m. | 10:35 a.m. |
| B | 2:07 a.m. | 6:21 a.m. | 8:28 a.m. | 10:35 a.m. | 12:42 p.m. |
| C | 4:14 a.m. | 8:28 a.m. | 10:35 a.m. | 12:42 p.m. | 2:49 p.m. |
| D | 6:21 a.m. | 10:35 a.m. | 12:42 p.m. | 2:49 p.m. | 4:56 p.m. |
| E | 8:28 a.m. | 12:42 p.m. | 2:49 p.m. | 4:56 p.m. | 7:03 p.m. |

Table V gives data illustrating another embodiment of 4-part cycle operation.

Table V
STREAM COMPOSITIONS AND QUANTITIES

Four part cycle.
Silica gel adsorbent.
Adsorption period, 3.08 hours.
Mass velocity through adsorbing bed, 2780 lb./hr.ft.$^2$
Mass velocity through cooling and stripping beds, 192 lb./hr.ft.$^2$
Two adsorbing beds in parallel.

| Component | Pound mols per hour | | | | | | |
|---|---|---|---|---|---|---|---|
| | Feed to adsorbers | Feed to cooler and stripper | Effluent from stripper | Feed to readsorber | Effluent from readsorber | Lean gas from adsorbers | Condensate from separator |
| Methane | 21,510 | 742 | 743 | 728 | 732 | 21,504 | 15.65 |
| Ethane | 278 | 9.59 | 9.77 | 9.00 | 10.02 | 277 | 0.77 |
| Propane | 145.3 | 4.94 | 5.32 | 4.32 | 7.04 | 142.2 | 1.01 |
| Isobutane | 35.56 | 1.13 | 1.52 | 1.03 | 4.03 | 32.17 | 0.49 |
| Normal butane | 46.62 | 1.42 | 2.09 | 1.30 | 6.78 | 40.46 | 0.80 |
| Isopentane | 17.66 | 0.61 | 16.27 | 7.48 | 0.62 | 8.86 | 8.79 |
| Normal pentane | 19.86 | 0.69 | 27.87 | 11.65 | 0.69 | 3.64 | 16.22 |
| Hexane | 18.32 | 0.65 | 25.20 | 6.23 | 0.00 | 0.00 | 18.97 |
| | 22,071 | 761 | 831 | 769 | 761 | 22,008 | 62.70 |
| Temperatures, °F | 81 | ¹80 | | 80 | 95 | 83 | 80 |

¹ To cooler only.

Stripping gas heater duty, average, 954,000 B.t.u./hr.
Condenser and cooler duty, average, 801,500 B.t.u./hr.

per hour given above, in our 4-part cycle (adsorption, readsorption, stripping, and cooling).

Table IV gives data illustrating another embodiment of 4-part cycle operation.

Table III
STREAM COMPOSITIONS AND QUANTITIES

Four part cycle.
Silica gel adsorbent.
Adsorption period, 4.23 hours.
Mass velocity through adsorbing bed, 2780 lb./hr.ft.$^2$
Mass velocity through cooling and stripping beds, 139 lb./hr.ft.$^2$
Two adsorbing beds in parallel.

| Component | Pound mols per hour | | | | | | |
|---|---|---|---|---|---|---|---|
| | Feed to adsorbers | Feed to cooler and stripper | Effluent from stripper | Feed to readsorber | Effluent from readsorber | Lean gas from adsorbers | Condensate from separator |
| Methane | 21,511 | 538 | 538 | 526 | 529 | 21,508 | 12.28 |
| Ethane | 278 | 6.95 | 7.02 | 6.42 | 7.14 | 277 | 0.60 |
| Propane | 144.4 | 3.58 | 3.72 | 2.97 | 4.73 | 142.4 | 0.75 |
| Isobutane | 34.37 | 0.82 | 0.94 | 0.62 | 2.53 | 32.34 | 0.32 |
| Normal butane | 44.91 | 1.03 | 1.23 | 0.74 | 4.68 | 40.77 | 0.49 |
| Isopentane | 17.69 | 0.44 | 9.74 | 4.27 | 0.48 | 12.18 | 5.47 |
| Normal pentane | 19.88 | 0.50 | 16.98 | 6.75 | 0.52 | 9.63 | 10.23 |
| Hexane | 18.50 | 0.47 | 24.68 | 5.71 | 0.00 | 0.00 | 18.97 |
| | 22,059 | 552 | 602 | 553 | 549 | 22,022 | 49.11 |
| Temperatures, °F | 80 | ¹80 | | 80 | 91 | 83 | 80 |

¹ To cooler only.

Stripping gas heater duty, average, 751,000 B.t.u./hr.
Condenser and cooler duty, average, 658,700 B.t.u./hr.

Table VI
STREAM COMPOSITIONS AND QUANTITIES

Four part cycle.
Silica gel adsorbent.
Adsorption period, 2 hours.
Mass velocity through adsorbing bed, 2780 lb./hr.ft.$^2$
Mass velocity through cooling and stripping beds, 295 lb./hr.ft.$^2$
Two adsorbing beds in parallel.

| Component | Pound mols per hour | | | | | | |
|---|---|---|---|---|---|---|---|
| | Feed to adsorbers | Feed to cooler and stripper | Effluent from stripper | Feed to readsorber | Effluent from readsorber | Lean gas from adsorbers | Condensate from separator |
| Methane | 21,511 | 1,142 | 1,145 | 1,125 | 1,133 | 21,500 | 19.67 |
| Ethane | 280 | 14.75 | 15.47 | 14.46 | 16.36 | 277 | 1.01 |
| Propane | 147.9 | 7.59 | 9.35 | 7.70 | 12.33 | 141.5 | 1.65 |
| Isobutane | 38.60 | 1.73 | 4.11 | 2.96 | 7.67 | 31.51 | 1.15 |
| Normal butane | 51.47 | 2.19 | 8.54 | 5.68 | 12.40 | 38.40 | 2.86 |
| Isopentane | 18.10 | 0.94 | 28.71 | 14.59 | 1.39 | 3.53 | 14.12 |
| Normal pentane | 19.06 | 1.05 | 37.10 | 17.25 | 0.25 | 0.01 | 19.85 |
| Hexane | 17.96 | 1.01 | 26.26 | 7.29 | 0.00 | 0.00 | 18.97 |
| | 22,084 | 1,171 | 1,275 | 1,195 | 1,183 | 21,992 | 79.28 |
| Temperatures, °F | 81 | ¹ 80 | ---------- | 80 | 94 | 85 | 80 |

¹ To cooler only.
Stripping gas heater duty, average, 1,512,000 B.t.u./hr.
Condenser and cooler duty, average, 1,211,000 B.t.u./hr.

Table VII gives data illustrating another embodiment of our 3-part cycle operation.

Table VII
STREAM COMPOSITIONS AND QUANTITIES

Three part cycle with recycle.
Silica gel adsorbent.
Adsorption period, 2 hours.
Mass velocity through adsorbing bed, 2780 lb./hr.ft.$^2$
Mass velocity through cooling and stripping beds, 295 lb./hr.ft.$^2$
Two adsorbing beds in parallel.

| Component | Pound mols per hour | | | | | |
|---|---|---|---|---|---|---|
| | Feed to adsorbers | Feed to cooler and stripper | Effluent from stripper | Recycle vapor from separator | Lean gas from adsorbers | Condensate from separator |
| Methane | 21,510 | 1,140 | 1,147 | 1,130 | 21,503 | 16.97 |
| Ethane | 279 | 14.73 | 16.19 | 15.27 | 277 | 0.92 |
| Propane | 145.1 | 7.59 | 11.06 | 9.51 | 141.7 | 1.55 |
| Isobutane | 35.00 | 1.73 | 5.44 | 4.07 | 31.29 | 1.37 |
| Normal butane | 48.22 | 2.19 | 9.15 | 6.38 | 38.49 | 2.77 |
| Isopentane | 24.30 | 0.93 | 13.80 | 7.58 | 11.43 | 6.22 |
| Normal pentane | 39.19 | 1.05 | 40.24 | 20.38 | 0.00 | 19.86 |
| Hexane | 26.84 | 1.01 | 27.85 | 8.88 | 0.00 | 18.97 |
| | 22,107.65 | 1,169 | 1.271 | 1,202 | 22,003 | 68.63 |
| Temperatures, °F | 80 | ¹ 80 | ---------- | 80 | ---------- | 80 |

¹ To cooler only.

Table VIII gives data illustrating another embodiment of our invention and employing activated carbon as the adsorbent in place of silica gel.

Table VIII
STREAM COMPOSITIONS AND QUANTITIES

Three part cycle with recycle.
Activated carbon adsorbent.
Adsorption period, 2 hours.
Mass velocity through adsorbing bed, 2780 lb./hr.ft.$^2$
Mass velocity through cooling and stripping beds, 295 lb./hr.ft.$^2$
Two adsorbing beds in parallel.

| Component | Pound mols per hour | | | | | |
|---|---|---|---|---|---|---|
| | Feed to adsorbers | Feed to cooler and stripper | Effluent from stripper | Recycle vapor from separator | Lean gas from adsorbers | Condensate from separator |
| Methane | 21,498 | 1,140 | 1,144 | 1,118 | 21,494 | 26.11 |
| Ethane | 278 | 14.73 | 16.21 | 14.82 | 277 | 1.39 |
| Propane | 146.4 | 7.59 | 13.51 | 10.78 | 140.5 | 2.73 |
| Isobutane | 39.57 | 1.73 | 13.13 | 8.64 | 28.17 | 4.49 |
| Normal butane | 62.70 | 2.19 | 39.49 | 23.63 | 25.40 | 15.86 |
| Isopentane | 30.54 | 0.93 | 31.47 | 13.82 | 0.00 | 17.65 |
| Normal pentane | 31.96 | 1.05 | 33.01 | 13.15 | 0.00 | 19.86 |
| Hexane | 23.71 | 1.01 | 24.72 | 5.75 | 0.00 | 18.97 |
| | 22,111 | 1,169 | 1,316 | 1,209 | 21,965 | 107.06 |
| Temperatures, °F | 80 | ¹ 80 | ---------- | 80 | 87 | 80 |

¹ To cooler only.
Stripping gas heater duty, average, 2,448,000 B.t.u./hr.
Condenser and cooler duty, average, 1,902,000 B.t.u./hr.

Table IX
COMPARISON OF RECOVERIES

| Cycle | Fourcent recovery | | | | |
|---|---|---|---|---|---|
| | Four part | | | | Three part |
| Adsorbent | Silica gel | | | | Carbon |
| Adsorption period, hr | 4.23 | 3.00 | 2.00 | 2.00 | 2.00 |
| Reference table | III | V | VI | VII | VIII |
| Propane | 0.5 | 0.7 | 1.2 | 1.1 | 1.9 |
| Isobutane | 1.0 | 1.5 | 3.5 | 4.2 | 13.7 |
| Normal butane | 1.2 | 1.9 | 6.9 | 6.7 | 38.4 |
| Isopentane | 31.0 | 49.8 | 80.0 | 35.2 | 100.0 |
| Normal pentane | 51.5 | 81.7 | 100.0 | 100.0 | 100.0 |
| Hexane | 100.0 | 100.0 | 100.0 | 100.0 | 100.0 |

In the above tabulations, the use of the heat ballast whether of the filter-type or of the delay-type, or a combination of both, does not affect product yield. The use of the ballasts serves to even out the heater (31) requirements and the cooler (44) requirements. That is, the heat load on the heater and the cooling load on the cooler and condenser fluctuate less than where ballasts are not used. The use of the ballasts prior to heater 31 provides for more nearly uniform heat output and therefore lengthens the operating life of the heater. Lengthening of the operating life of cooler 44 is to a somewhat lesser extent than to the heater 31.

Another advantage of our heat ballast operation is that in most instances the ballast reduces the temperature fluctuations in the hot coolant stream passing to the heater to such an extent that the heater can be operated under nearly constant heating conditions. For example, when temperature of the effluent coolant gases issuing from the delay-type ballast vary from the hereinbefore-mentioned 230° F. to 330° F. the heater can be operated at a uniform heat input when the stripping operation can tolerate inlet of stripping gas at somewhat varying temperatures. For example, when stripping gas temperature somewhat below and somewhat above 400° F. can be tolerated, it is not necessary to vary the fuel to the heater at all. In this instance stripping gas temperature to the heater varies from about 230° F. to about 330° F. and by operating with constant fuel to the heater, the filtering action of the heater reduces the temperature variation of the heated gas to about 50°, that is, the heated gas varies from about 425° F. to about 375° F. The resulting temperature wave, progressing downwardly in the vessel being stripped would be used very efficiently, as any part of the bed at 425° F. would have been above 300° F. long enough to retain only the heaviest fractions. The subsequent drop in temperature to 375° F. in the desorber would be in the right direction because the cooling step follows immediately.

While the feed gas temperature herein disclosed was taken at 80° F., in normal plant operation the feed gas temperature is ordinarily that of the atmosphere or that obtained by heat exchange with plant cooling water.

It is found that recoveries of butanes and propane continue increasing as the adsorption period is decreased but there is, obviously, a practical limit to the shortening of the operating period.

While certain embodiments of the invention have been described for illustrative purposes, the invention obviously is not limited thereto.

We claim:

1. A process for reducing cyclic temperature variations of a stream of fluid having alternately a high temperature followed by a low temperature, comprising the steps of dividing said stream into two parallel flow portions having parallel cyclic temperature variations, passing one flow portion continuously into a zone containing a bed of a solid heat exchange material at a temperature intermediate said high temperature and said low temperature, withdrawing said one flow portion having cyclic temperature variations from said zone, the cyclic temperature variations of the withdrawn one portion being delayed about a half cycle behind the cyclic variation of the other flow portion, combining the withdrawn one portion with its delayed cyclic temperature variation with the other portion having its original temperature variation cycle whereby the cyclic temperature variation of the combined stream is smaller than the cyclic temperature variation of the original stream of fluid.

2. In the process of claim 1 wherein said bed of solid heat exchange material in said zone is a delay heat ballast bed.

3. In a process for treating a feed stream of vaporous material by selective adsorption for the separation of a first component from a second component, the improvement comprising dividing said feed stream into two parallel flow portions, one portion being a minor portion and the other a major portion, contacting said major portion as a feed stock in a first contacting operation with a first body of an adsorbent selective for adsorbing said first component, from this adsorbing step withdrawing contacted vaporous material containing a smaller concentration of said first component than the feed stream as product, simultaneously contacting in a second contacting operation a second body of said adsorbent previously charged with said first component with a stream of hot stripping gas as subsequently produced, withdrawing hot stripping gas containing stripped first component from said second body of adsorbent, cooling the withdrawn gas from said second body of adsorbent thereby producing condensate, separating this condensate from uncondensed gas, withdrawing said condensate as product, combining this uncondensed gas with said feed stock prior to said first contacting operation, simultaneously cooling in a third operation a hot third body of said adsorbent previously stripped of said first component with a stream of cooling gas, said stream of cooling gas being said minor portion of said feed stream, withdrawing heated cooling gas from said third body of adsorbent, further heating the withdrawn heated cooling gas, this further heated cooling gas being the aforementioned hot stripping gas as subsequently produced.

4. In a process for treating a feed stream of vaporous material by selective adsorption for the separation of a first component from a second component, the improvement comprising dividing said feed stream into two parallel flow portions, one portion being a minor portion and the other a major portion, contacting said major portion as a feed stock in a first contacting operation with a first body of an adsorbent selective for adsorbing said first component, from this adsorbing step withdrawing contacted vaporous material containing a smaller concentration of said first component than the feed stream as product, simultaneously contacting in a second contacting operation a second body of said adsorbent containing previously adsorbed first component with a gas richer in said first component than said feed stream as subsequently produced, withdrawing contacted gas from this second operation containing a smaller concentration of said first component than said gas richer in said first component than said feed stream, combining this withdrawn gas with the major portion of said feed stream prior to said first contacting operation, simultaneously contacting in a third contacting operation a third body of said adsorbent previously charged with said first component in said second operation with a stream of hot stripping gas as subsequently produced, withdrawing hot stripping gas containing stripped first component from said third body of adsorbent, cooling the withdrawn gas from said third body of adsorbent thereby producing condensate, separating this condensate from uncondensed gas, withdrawing said condensate as product, said uncondensed gas being the aforementioned gas richer in said first component than said feed stream as subsequently produced, simultaneously cooling in a fourth operation a hot fourth body of said adsorbent previously stripped of said first component with a stream of cooling gas, said stream of cooling gas being said minor portion of said feed stream, withdrawing heated cooling gas from said fourth body of adsorbent, further heating the withdrawn heated cooling gas, this further heated cooling gas being the aforementioned hot stripping gas as subsequently produced.

5. In the process of claim 3, minimizing temperature variations of the withdrawn heated cooling gas from said third body of adsorbent by passing same through a heat ballast containing zone, then further heating the with-drawn heated cooling gas, this latter further heated cooling gas being the aforementioned hot stripping gas as subsequently produced.

6. In the process of claim 3, minimizing temperature variations of the withdrawn hot stripping gas containing stripped first component from said second body of adsorbent by passing same through a heat ballast containing zone, cooling the gas of minimized temperature variations thereby producing said condensate.

7. The process of claim 5 wherein said heat ballast is a short flow path bed of heat ballast material.

8. The process of claim 5 wherein said heat ballast is a delay heat ballast bed.

9. In the process of claim 6 wherein said heat ballast is a short flow path bed of heat ballast material.

10. In the process of claim 6 wherein said heat ballast is a delay heat ballast bed.

11. In a process for treating a feed stream of vaporous material by selective adsorption for the separation of a first component from a second component, the improvement comprising dividing said feed stream into first, second and third portions, said first portion being a minor portion and the second and third portions together being a major portion, contacting said third portion in a first contacting operation with a first body of an adsorbent selective for adsorbing said first component from said second component, simultaneously contacting in a second contacting operation a second body of said adsorbent material previously partially charged with said first component with the second portion of the feed stream, withdrawing contacted vaporous material containing smaller concentrations of said first component than the feed stream from the first and second contacting operations as product, simultaneously contacting in a third contacting operation a third body of said adsorbent previously charged with said first component in said second contacting operation with a stream of hot stripping gas subsequently produced, withdrawing hot stripping gas containing stripped first component from said third body of adsorbent, cooling the withdrawn gas from said third body of adsorbent thereby producing condensate, separating this condensate from uncondensed gas as another product, also adding this uncondensed gas to the second and third portions of said feed stream, simultaneously cooling in a fourth operation a hot fourth body of said adsorbent previously stripped of said first compenent with a stream of cooling gas, said stream of cooling gas being the first portion of said feed stream, withdrawing heated cooling gas from said fourth body of adsorbent, further heating the withdrawn heated cooling gas to the stripping temperatures, the further heated cooling gas being the aforementioned hot stripping gas subsequently produced.

12. A method for cooling a bed of hot solid adsorbent material previously stripped of adsorbed constituents comprising dividing a stream of feed gas to be subsequently treated by contacting with adsorbent into two parallel flow portions, one being a minor portion and the other a major portion, said portions having temperatures substantially that of the atmosphere, passing said minor portion of feed gas at said temperature through a bed of said hot solid adsorbent material for such a length of time required to cool said material to substantially said atmospheric temperature, and subsequently passing said major portion of feed gas through the so cooled bed of adsorbent material in an adsorption operation.

13. An apparatus for minimizing temperature variations of a stream of fluid varying in temperature cyclically between an upper limit and a lower limit comprising a tubular vessel having an inlet and an outlet for inlet and outlet of fluid passing therethrough, first and second tubular members disposed within said vessel, the axes of said vessel and said members being approximately parallel, said first tubular member being so arranged within said second tubular member as to provide a first annulus therebetween, a coarse size heat exchange material substantially filling said annulus, said second tubular member being so disposed within said tubular vessel to provide a second annulus therebetween, said first and second tubular members having one end of each adjacent said inlet open, first means sealing fluid-tight the end of said tubular member adjacent said inlet, and second means closing the end of the first annulus adjacent said outlet.

References Cited in the file of this patent

UNITED STATES PATENTS

| | | |
|---|---|---|
| 1,871,166 | Fahrbach | Aug. 9, 1932 |
| 2,784,805 | Odle et al. | Mar. 12, 1957 |
| 2,862,434 | Edwards | Dec. 2, 1958 |
| 2,891,774 | Theoclitus | June 23, 1959 |